United States Patent
Foury et al.

(10) Patent No.: US 6,508,701 B1
(45) Date of Patent: Jan. 21, 2003

(54) AIR CONDITIONING INSTALLATION FOR A VEHICLE, WITH GENTLE DIFFUSION

(75) Inventors: Guillaume Foury, Elancourt (FR); Carine Paumier, Versailles (FR); Gilles Elliot, Courcouronnes (FR); Didier Loup, Maurepas (FR); Pascale Petitjean, Neauphle le Vieux (FR)

(73) Assignee: Valeo Climatosation, La Verriere (FR)

( * ) Notice: Subject to any disclaimer, the term of this patent is extended or adjusted under 35 U.S.C. 154(b) by 0 days.

(21) Appl. No.: 09/678,803

(22) Filed: Oct. 4, 2000

(30) Foreign Application Priority Data

Oct. 5, 1999 (FR) .............................. 99 12385

(51) Int. Cl.⁷ ................................ B60H 1/26
(52) U.S. Cl. ..................................... 454/121
(58) Field of Search ................ 454/121, 126, 454/152

(56) References Cited

U.S. PATENT DOCUMENTS 5,620,366 A * 4/1997 Munzel et al. .............. 454/152
5,673,964 A * 10/1997 Roan et al. ............. 454/121 X
5,709,601 A * 1/1998 Heck .......................... 454/121
5,934,744 A * 8/1999 Jergens et al. .......... 454/121 X
6,110,037 A * 8/2000 Yoshinaka .............. 454/127 X

FOREIGN PATENT DOCUMENTS

| DE | 38 18 666 A | * 12/1999 | ................. 454/152 |
|---|---|---|---|
| EP | 0713798 | 5/1996 | |
| EP | 0756955 | 2/1997 | |

* cited by examiner

Primary Examiner—Harold Joyce
(74) Attorney, Agent, or Firm—Liniak, Berenato & White

(57) ABSTRACT

The air conditioning installation has air treatment and distribution means in a housing with air outlets on an upper face. De-icing and central aeration ducts are in an oblong diffusion unit above the upper face of the housing and under the upper fascia of the dashboard. This upper fascia has a diffusing surface in excess of 1.5 dm² and preferably in excess of 2.5 dm². In an embodiment, the diffusing surface is produced by multiple perforations.

20 Claims, 12 Drawing Sheets

AIR CONDITIONING INSTALLATION FOR A VEHICLE, WITH GENTLE DIFFUSION

FIELD OF THE INVENTION

The invention relates to an installation for heating, ventilating and/or air conditioning the passenger compartment of a vehicle. Such an installation generally has air treatment and distribution means accommodated at least partly in a housing provided with air outlets, the de-icing air outlet and the central aeration air outlet, at least, opening into a specifically shaped upper face of the said housing and being capable of delivering treated air respectively to a de-icing vent and a central aeration vent, which are provided in a fascia of a dashboard, via ducts connecting the said outlets to the said vents, the said dashboard having an upper fascia and a front fascia.

BACKGROUND OF THE INVENTION

The central aeration vent is usually situated in the front fascia of the dashboard or in the upper part of the central console, within the envelope of the driver's arms' reach. The space available for the central console is hence limited in height and in depth. The air passage cross-section of this vent is furthermore limited. The central aeration is therefore forced aeration, which creates turbulence in the passenger compartment owing to the high speeds of the aeration air.

International standard ISO 3958 of 15/02/1996 defines arms' reach zones for the driver of a motor vehicle. These zones are defined as being contained within the outer envelope of two spheres defined geometrically with respect to the driver's seat. Each sphere corresponds to the movement of one of the driver's hands. The passenger's arms' reach zones can be deduced by symmetry with respect to the plane of symmetry of the passenger compartment.

The references in FIG. 10 represent the following:

Pb—the outer envelope of a dashboard of a motor vehicle,
Cd—the outer envelope of the movement of the driver's right hand, corresponding to gripping with three fingers,
Cg—the outer envelope of the movement of the driver's left hand, corresponding to gripping with three fingers,
Pg—the outer envelope of the movement of the passenger's left hand, corresponding to gripping with three fingers,
Pd—the outer envelope of the movement of the passenger's right hand, corresponding to gripping with three fingers,
Cgb—the outer envelope of the movement of the driver's left hand, corresponding to gripping by the fingertips,
Cdb—the outer envelope of the movement of the driver's right hand, corresponding to gripping by the fingertips,
Pgb—the outer envelope of the movement of the passenger's left hand, corresponding to gripping by the fingertips,
Pdb—the outer envelope of the movement of the passenger's right hand, corresponding to gripping by the fingertips.

These various spherical envelopes cut the outer envelope Pb of the dashboard along curvilinear lines, which divide the outer envelope Pb of the dashboard into different zones, accessible or not accessible to the fingers of one of the driver's or passenger's hands when gripping with three fingers or by the fingertips. These curved lines and the corresponding zones are shown in FIGS. 11*a* to 11*g*.

The zone A1 is the part of the dashboard that lies in the intersection of the envelopes Cd and Pg.

The zone B1 is complementary to the zone A1 in the envelope Pb of the dashboard.

The zone A2 is the part of the dashboard that lies in the intersection of the envelopes Cdb and Pgb.

The zone B2 is complementary to the zone A2 in the envelope Pb of the dashboard.

The zone A3 is the part of the dashboard that lies in the junction of the envelopes Cd and Pg.

The zone B3 is complementary to the zone A3 in the envelope Pb of the dashboard.

The zone A4 is the part of the dashboard that lies in the junction of the envelopes Cd, Cg, Pd and Pg.

The zone B4 is complementary to the zone A4 in the envelope Pb of the dashboard.

The zone A5 is the part of the dashboard that lies in the junction of the envelopes Cdb and Pgb.

The zone B5 is complementary to the zone A5 in the envelope Pb of the dashboard.

The zone A6 is the part of the dashboard that lies in the junction of the envelopes Cdb, Cgb, Pdb and Pgb.

The zone B6 is complementary to the zone A6 in the envelope Pb of the dashboard.

In the definitions above, the vehicle is assumed to have a left-hand driving position. In the case of a vehicle with a right-hand driving position, the words driver and passenger merely have to be interchanged in the definitions.

The first object of the invention is to increase the space available for the console in the central zone of the dashboard.

SUMMARY OF THE INVENTION

According to one aspect of the present invention there is provided a installation for heating, ventilating and/or air conditioning the passenger compartment of a vehicle, of the type having air treatment and distribution means accommodated at least partly in a housing provided with air outlets, in particular a de-icing air outlet and a central aeration air outlet which can deliver treated air respectively to a de-icing vent and a central aeration vent, which are provided in a fascia of a dashboard, via ducts connecting the said outlets to the said vents, the said dashboard having an upper fascia and a front fascia, wherein the central aeration vent is located exclusively in the zone of the envelope of the dashboard located outside the intersection of the outer envelopes of the movement of the driver's right hand and of the passenger's left hand, corresponding to gripping with three fingers.

So as to further increase the regions of the dashboard which can be equipped with control knobs, the central aeration vent is positioned exclusively in one of the zones B2 to B6 defined above.

The second object of the invention is to eliminate the turbulence in the passenger compartment, especially when the device is an air conditioning device.

These objects are achieved according to the invention by the fact that the central aeration vent has a diffusing surface whose passage cross-section is at least equal to 1.5 dm$^2$.

Advantageously, the passage cross-section of the diffusing surface is at least equal to 2.5 dm$^2$.

According to a second characteristic of the invention, the ducts connecting the outlets of the upper face of the housing to the corresponding vents are arranged in a diffusion unit which extends transversely under the upper fascia of the dashboard, the said diffusion unit having, in its front central zone, at least one de-icing duct directed at the windscreen, and, to the rear of the de-icing duct, at least one central aeration duct produced in the form of an oblong diffusion chamber which extends transversely under the upper fascia of the dashboard.

This arrangement makes it possible to reduce the number of connecting pieces, simplify the assembly of the cockpit, and improve on the aerodynamic efficiency of the device, by reducing the pressure losses in the ducts.

Advantageously, the diffusion chamber extends transversely over the entire length of the upper fascia of the dashboard. The upper fascia of the dashboard is produced in the form of a hood, which covers the diffusion unit. This hood preferably has multiple perforations above the diffusion chamber.

Advantageously, the de-icing duct and the diffusion chamber are bounded by thin walls. The diffusion unit is preferably produced by assembling two complementary pieces moulded in thermoplastic material. The diffusion unit and the housing are fixed onto a cross-member or onto the bulkhead.

According to a first variant of the installation, the lateral aeration air outlets of the housing also open into the upper face of the said housing, the said outlets being capable of delivering treated air to the lateral aeration vents provided in the fascia of the dashboard, via lateral aeration ducts connecting the said outlets to the said vents. The said lateral aeration ducts are then advantageously arranged in the diffusion unit and extend laterally under the diffusion chamber.

Preferably, the air inlet of the lateral aeration ducts is located between the air inlets of the de-icing duct and of the diffusion chamber, and their outlets are provided in the front lateral corners of the upper fascia of the dashboard.

Advantageously, the diffusion unit is produced by assembling two complementary pieces moulded in thermoplastic material, one of the pieces being in the form of a trough having an air inlet matched to the shape of the upper face of the housing, the other piece fitting into the said trough and constituting the partitions separating the various ducts.

According to a second variant of the installation, the housing furthermore has lateral outlets for delivering air, on the one hand, to lateral aeration vents provided in a fascia of the dashboard, via lateral aeration ducts connecting the said outlets to the said vents and, on the other hand, to feet aeration vents which open into the lower zone of the passenger compartment, via lower ducts. The said lateral aeration ducts and the said lower ducts are then advantageously arranged in a lower part of the diffusion unit.

Preferably, the diffusion unit is produced by assembling two complementary pieces moulded in thermoplastic material, namely a main piece having thin walls partly bounding the ducts, and a lower cover which completes the ducts.

BRIEF DESCRIPTION OF THE DRAWINGS

Exemplary preferred embodiments of the invention will now be described with reference to the accompanying drawings, in which:

in FIG. 7, the air conditioning apparatus is mounted on a cross-member;

In FIG. 8, the main piece of the diffusion unit is mounted on the cross-member, without the lower cover;

FIG. 9 shows the cockpit after mounting of the lower cover, the meters and indicators, the console, the dashboard body, the hood and the steering column;

FIGS. 10 and 11a to 11b were discussed in the introduction, and do not require any additional explanation.

DESCRIPTION OF THE PREFERRED EMBODIMENTS

Figure 1:
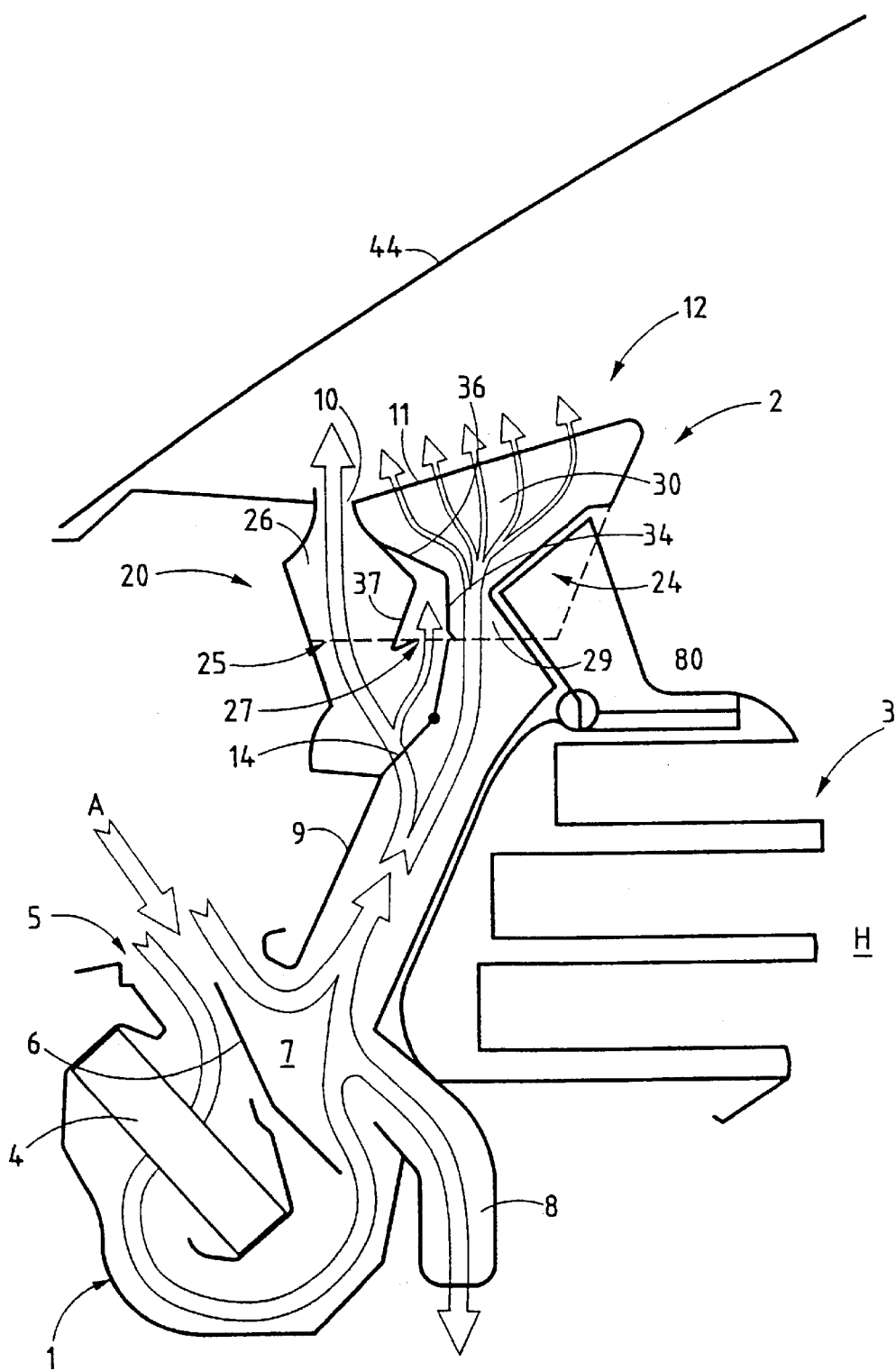
FIG. 1 is a schematic section on the median vertical plane of the cockpit of a vehicle equipped with the air conditioning installation of the invention according to a first alternative embodiment.
Figure 2:
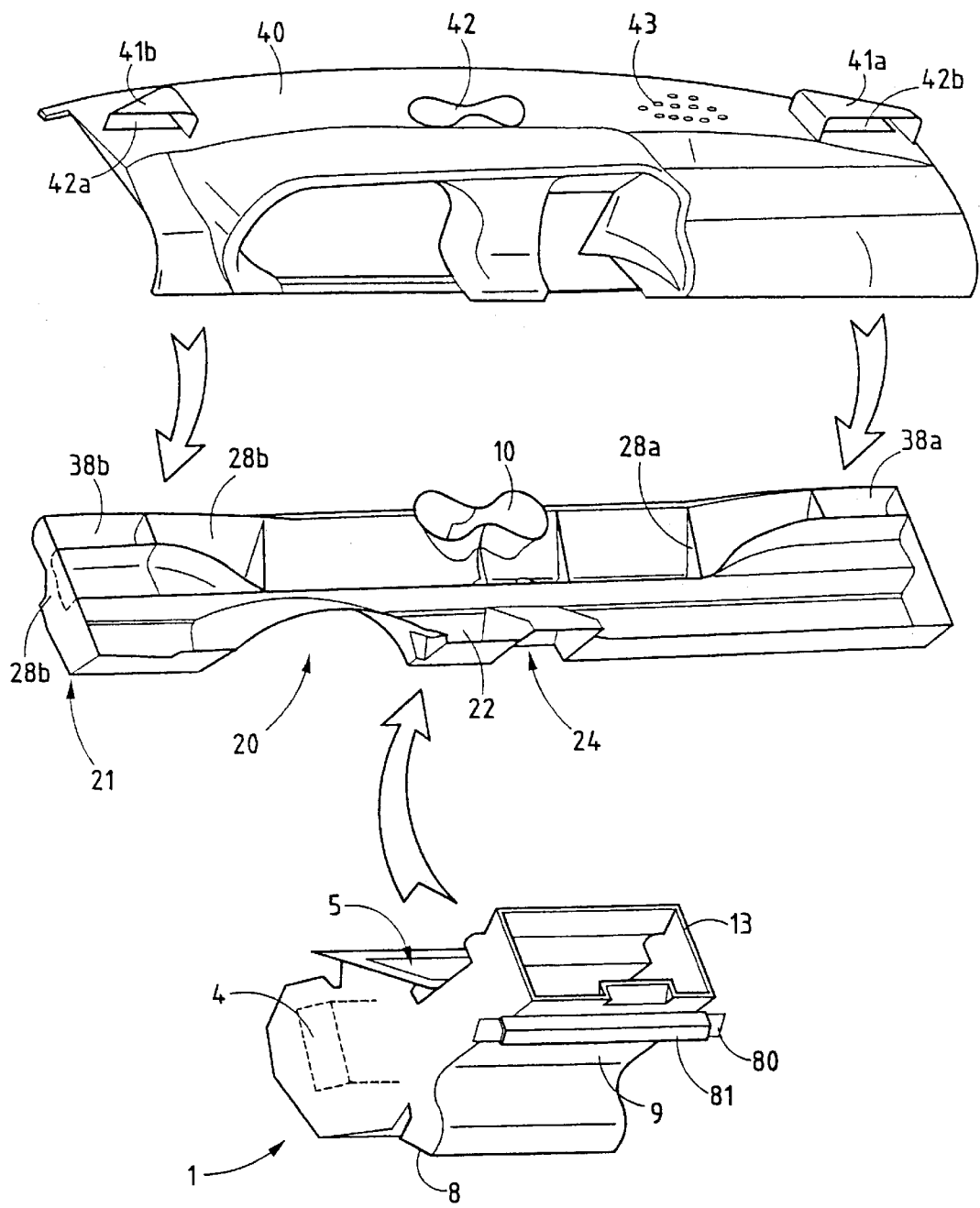
FIG. 2 is an exploded perspective view of the installation in FIG. 1, which shows the air conditioning apparatus, the diffusion unit and the hood forming the upper fascia of the dashboard.
Figure 3:
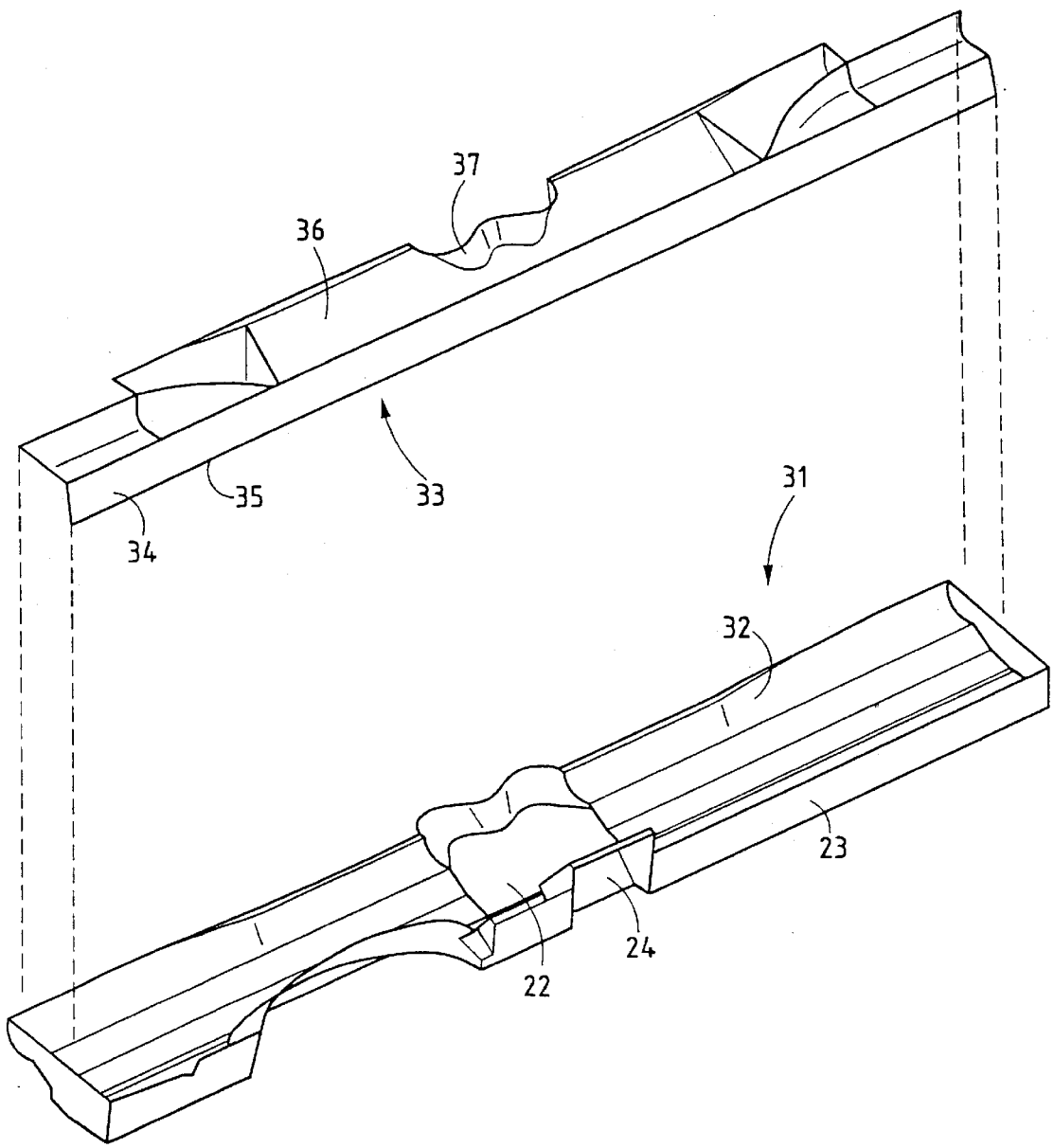
FIG. 3 is an exploded perspective view of the diffusion unit in FIG. 2.
Figure 4:
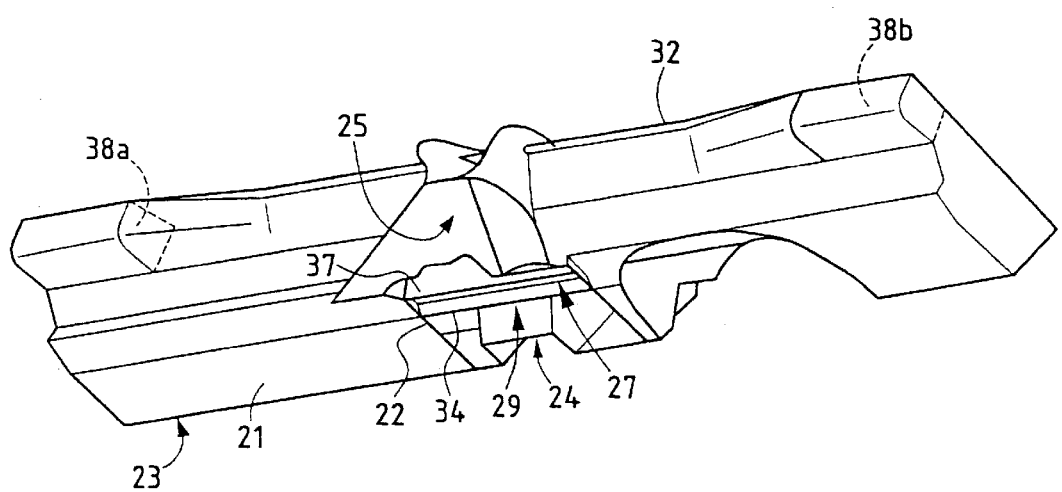
FIG. 4 is a view from below of the diffusion unit according to the first alternative embodiment.

In the various figures, like reference numerals indicate like parts.

FIGS. 1 to 4 show a heating, ventilating and/or air conditioning installation according to a first preferred embodiment of the invention, which has, in a housing 1 situated in the central zone of a motor-vehicle cockpit 2 and to the front of a central console 3, means for heating some of the air A delivered by a motor-driven fan unit (not shown in the drawings). The air A enters the housing 1 through an inlet 5, then is separated by a temperature control flap 6 into a first, upper flow and a second, lower flow which passes through a heating branch in which a heat exchanger is installed. The two flows are then combined in a mixing zone 7, from where the treated air feeds a lower duct 8 intended for heating the lower zones of the passenger compartment H, and in particular the front passengers' feet, and a substantially vertical upper duct 9 situated behind the console 3. The upper duct 9 is intended to deliver de-icing air to a de-icing vent 10 situated in the upper fascia 11 of the dashboard 12, and aeration air to a central aeration vent and two lateral vents situated in the fascia of the dashboard 12. The upper duct 9 opens into an upper face 13, of rectangular overall shape, of the housing 1. This upper face 13 preferably extends in a substantially horizontal plane, below the upper fascia 11 of the dashboard 12 and to the front of the central console 3. Upstream of the upper face 13, the upper duct 9 is equipped with at least one distribution flap 14 which makes it possible to regulate the flow rates of air for de-icing, central aeration and lateral aeration, under the control of a distribution knob mounted on the dashboard 12 or on the central console 3.

According to the invention, an oblong diffusion unit 20, which extends over the entire width of the passenger compartment H, and to the rear of the windscreen 44, is situated between the upper face 13 of the housing 1 and the upper fascia 11 of the dashboard 12. This diffusion unit 20, which only has thin walls bounding the air ducts feeding the de-icing vents 10 and the aeration vents, has, on its lower surface 21, an opening 22 which fits onto the upper face 13 of the housing 1, and, on its rear face 23 which can be seen from the passenger compartment H, a recess 24 located above the console 3 and intended to accommodate additional displays.

The air inlet 25 of the de-icing duct 26 is located above the front zone of the upper face 13 of the housing 1, and the de-icing duct 26 extends substantially vertically in the central front zone of the distribution unit 20.

The air inlet 27 of the lateral aeration ducts 28a and 28b, which are intended to deliver air to the lateral aeration vents, is located above the central zone of the upper face 13 of the housing 1.

The air inlet 29 of the central aeration duct 30 is located above the rear zone of the upper face 13 of the housing 1.

The diffusion unit 20 is produced by assembling two pieces, which are preferably obtained by injection-moulding a thermoplastic material.

One of these pieces 31 is in the form of a trough, in whose bottom the opening 22 matched to the upper face 13 of the housing 1 is arranged. The recess 24 is arranged on the rear wall 23 of this trough 31. Its front wall 32, in its central zone, bounds partly the de-icing duct 26 and, in its lateral zones, partly the lateral aeration ducts 28a and 29a.

The second piece 33 is in the form of a plate, of L-shaped overall cross-section, which is fixed in the trough 31 so as to create leaktight channels. This second piece 33 has a vertical wall 34, which has a height less than the depth of the trough 31, the lower edge 35 of which is fixed on the bottom of the trough 31. This vertical wall 34 extends transversely over the entire length of the trough 31. It also has an inclined wall 36, which connects the upper edge of the vertical wall 34 to the upper edge of the front wall 32 of the trough 31 in the lateral zones, and a complementary wall 37, in its front central zone, which completes the de-icing duct 26. The complementary wall 37 and the vertical wall 34 bound the air inlet 27 of the lateral aeration ducts 28a and 28b, these latter extending transversely under the inclined wall 36.

The inclined wall 36 does not extend over the entire length of the trough 31. The ducts 28a and 28b hence open onto the upper face of the diffusion unit 20 via openings 38a and 38b located in the front lateral corners of the said diffusion unit 20.

The central aeration duct 30 is hence bounded by the rear wall 23 of the trough 31, the bottom of the latter, the vertical wall 34 of the second piece 33, and the inclined wall 36. This duct is hence in the form of a diffusion chamber with a very large horizontal cross-section, which widens upwards and forwards, extends over almost the entire surface of the trough 31, apart from the surfaces of the outlets 38a and 38b of the lateral aeration ducts 28a and 28b, and opens under the upper fascia 11 of the dashboard.

This upper fascia 11 is in the form of a hood 40 which has an opening 42 for the passage of the de-icing vent 10, secured to the diffusion unit 20, two lateral caps 41a and 41b, which will cover the outlets 38a and 38b of the lateral aeration ducts 28a and 28b and which have openings 42a and 42b directed towards the inside of the passenger compartment H and intended to deliver lateral aeration air, and a zone 43 of large size which covers the diffusion chamber 30. This zone 43 of large size has a diffusing surface whose air passage cross-section is at least equal to 1.5 dm2, preferably in excess of 2.5 dm$^2$, or even 3 dm$^2$. These values correspond to the total aperture of the passage cross-section.

The passage cross-section can be regulated by deflectors or louvers mounted under the hood. This zone 43 may be produced, for example, in the form of a multiply perforated plate, whose orifices make it possible to diffuse aeration air at low speed. The hood 40 covers the diffusion unit 20 and extends forwards as far as the base of the windscreen 44.

FIGS. 5 to 9 show a heating, ventilating and/or air conditioning installation according to a second preferred embodiment of the invention, which differs from the first embodiment described above by the fact that the lateral aeration air outlets of the housing are situated in the lower part of the housing.

The housing 1, also situated in the central zone of a motor-vehicle cockpit 2, and to the front of a central console 3, has a heat exchanger 4 in a lower heating branch located below an upper fresh-air transmission branch, these branches being situated between an air inlet 5 and a mixing zone 7. The allocation of the air A on entry between these two branches is carried out by a temperature control flap 6. From the mixing zone 7, some of the air is delivered to a chamber 50, which feeds two lateral ducts 51a and 51b and a lower duct 8 for heating the feet, and the rest is delivered to a substantially vertical upper duct 9 situated behind the console 3. The upper duct 9 is intended to deliver de-icing air to a de-icing vent 10 situated in the upper fascia 11 of the dashboard 12, and aeration air to a central aeration vent situated in the fascia of the dashboard 12.

As in the case of the first embodiment of the invention, the upper duct 9 opens into an upper face 13, of rectangular overall shape, of the housing 1. This upper face 13 extends in a substantially horizontal plane, below the upper fascia 11 of the dashboard 12 and to the front of the central console 3. Upstream of the upper face 13, the upper duct 9 is equipped with at least one distribution flap 14 which makes it possible to regulate the flow rates of air for de-icing and central aeration, under the control of a distribution knob mounted on the dashboard 12 or on the central console 3.

The chamber 50 has two lateral outlets on the two vertical lateral faces of the housing 1, onto which the inlets of the lateral aeration ducts 51a and 51b will be connected, these lateral faces converging towards the inside of the passenger compartment H.

Figure 5:
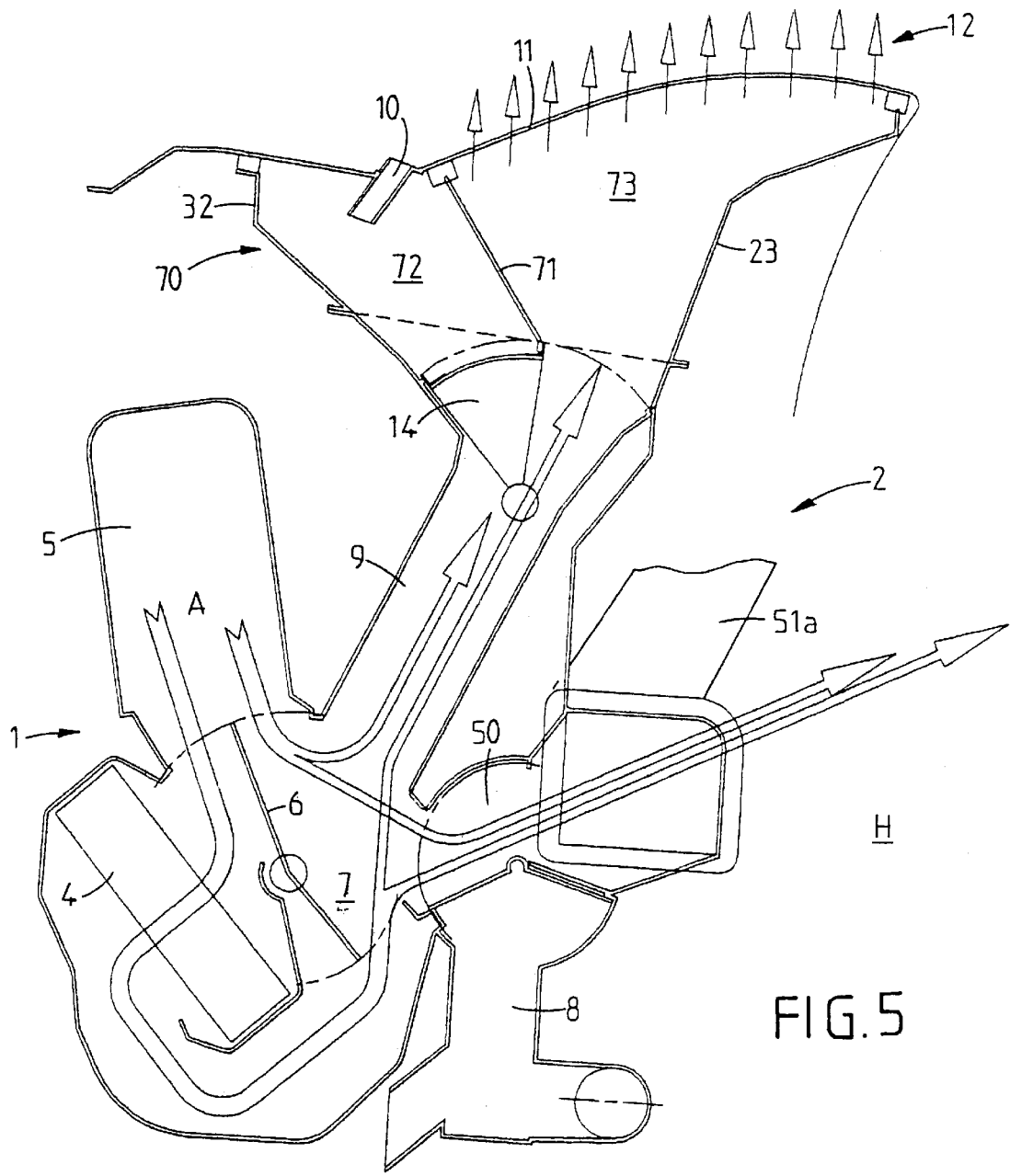
FIG. 5 is a schematic view taken along the centerline of the vehicle cockpit equipped with the air conditioning installation of the invention according to a second alternative embodiment.
Figure 6:
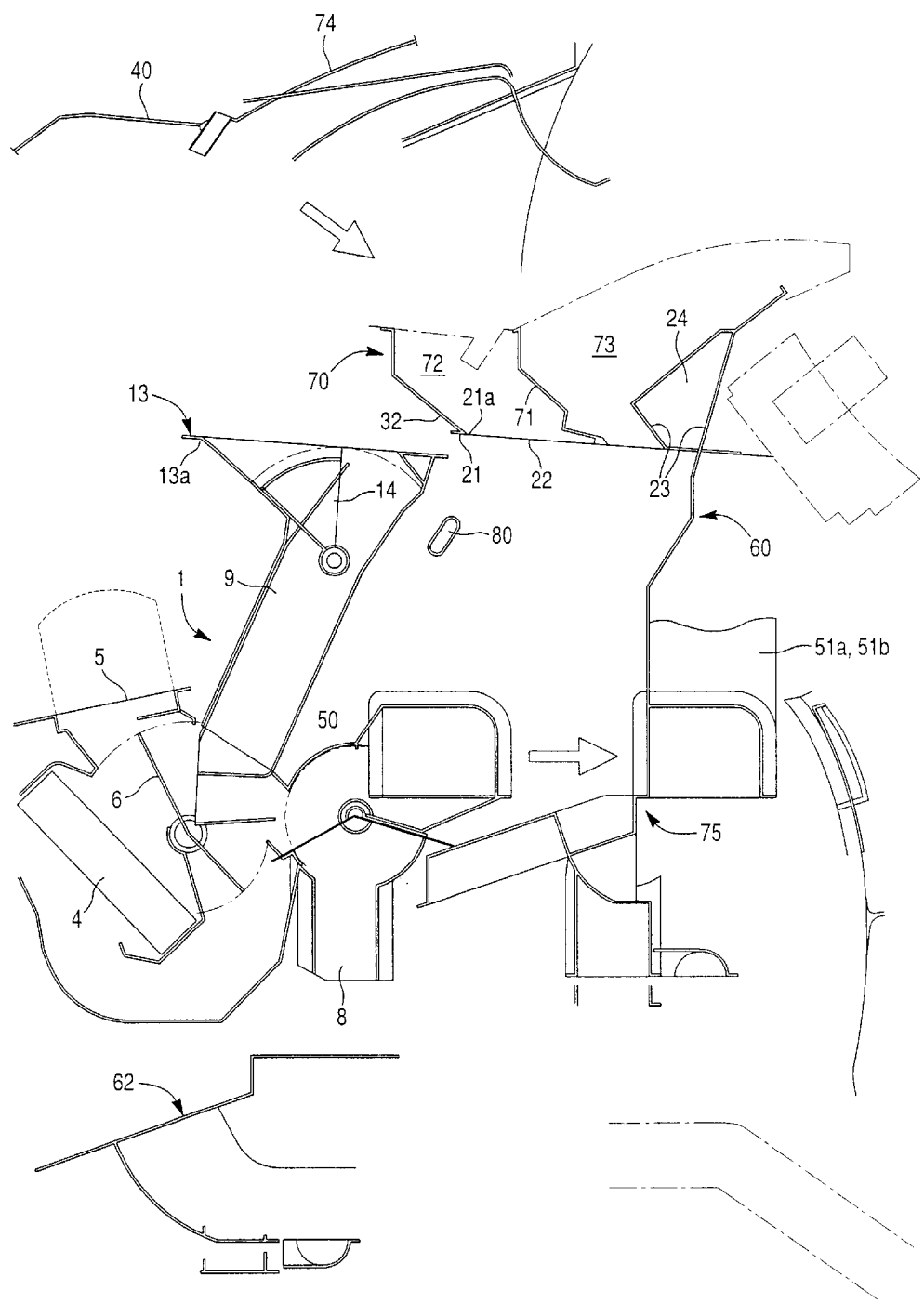
FIG. 6 shows an exploded section of the various components of the device in FIG. 5.
Figure 7:
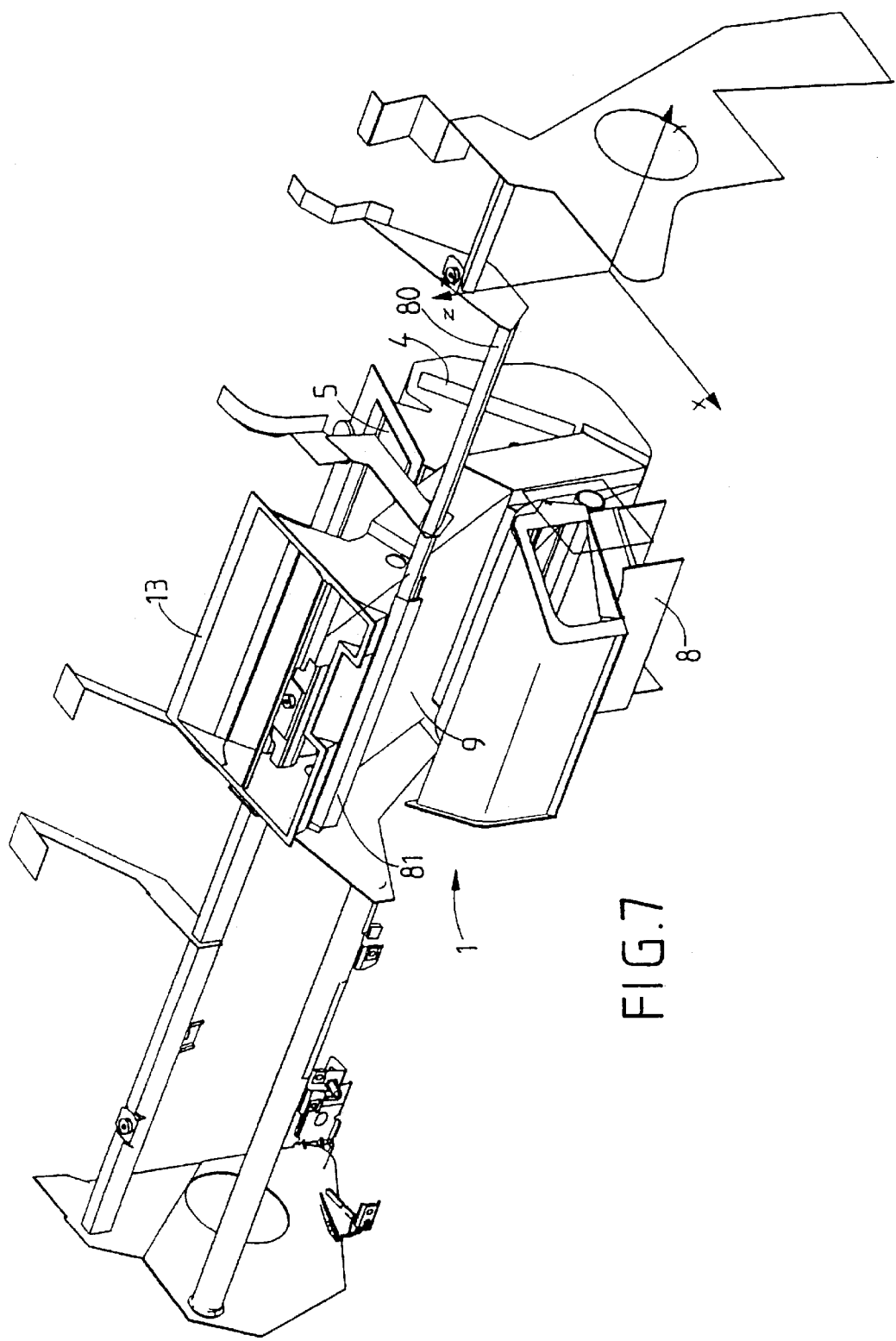
FIGS. 7 to 9 show the various phases of the assembly of the cockpit according to the second alternative embodiment.
Figure 8:
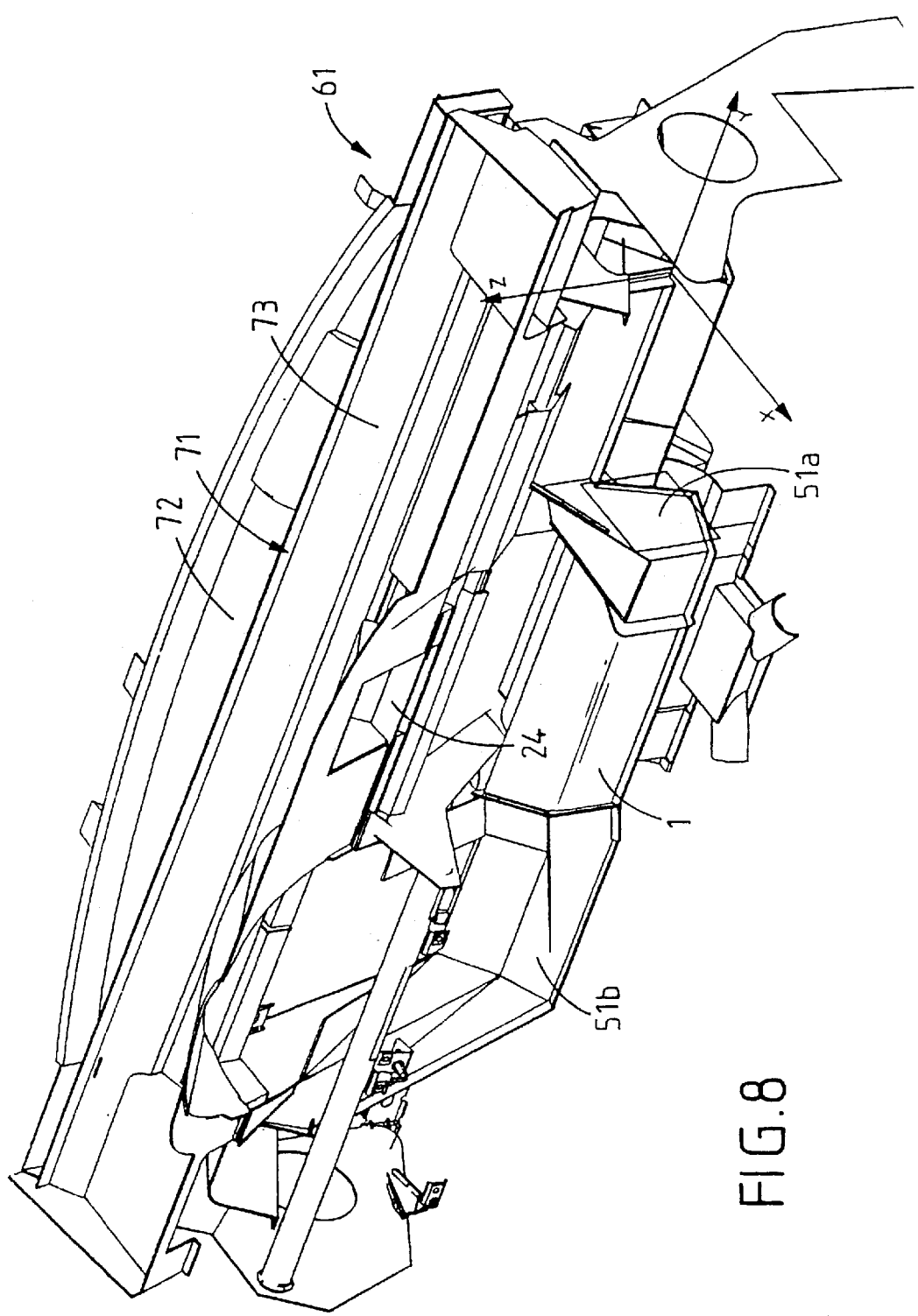
Figure 9:
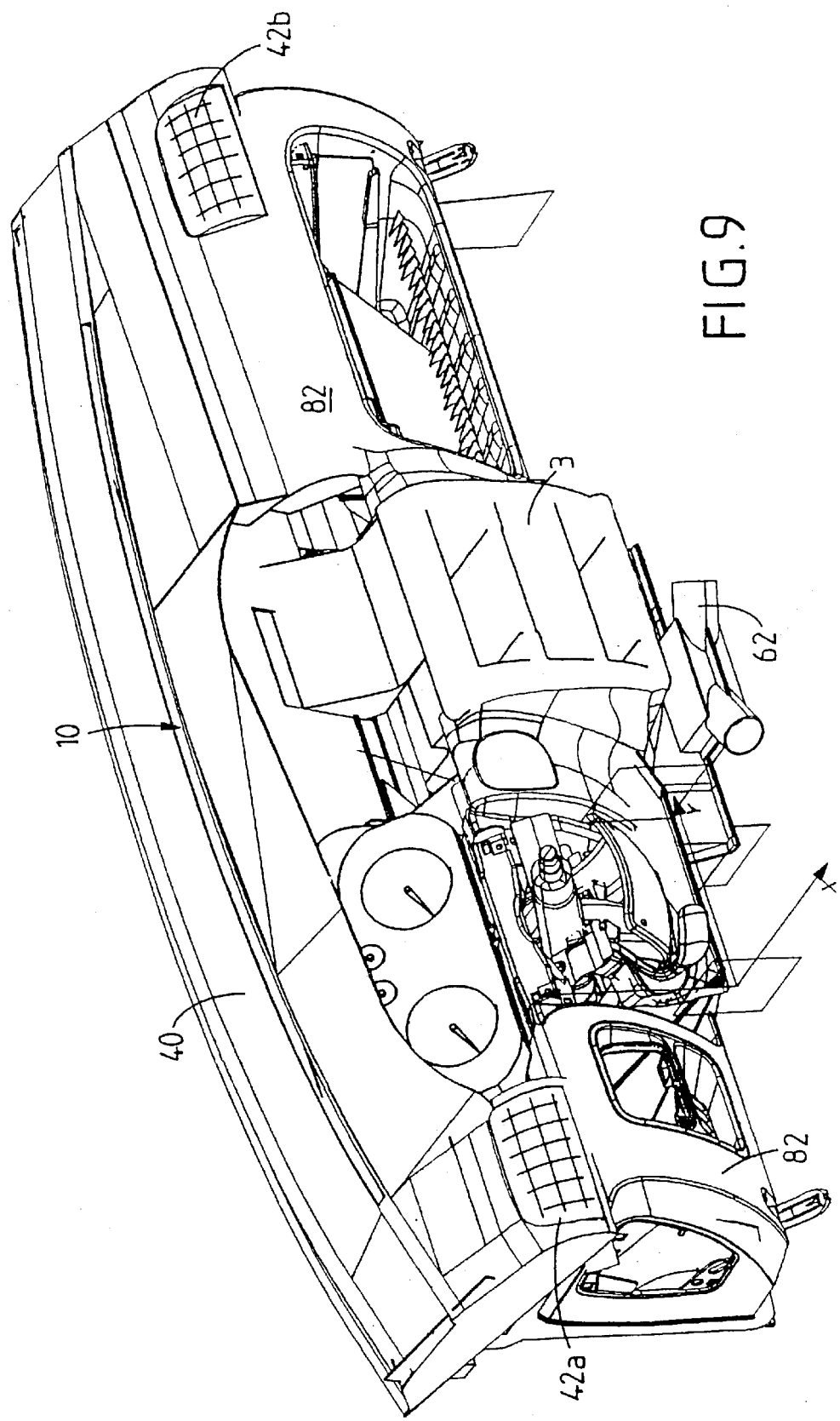
Figure 10:
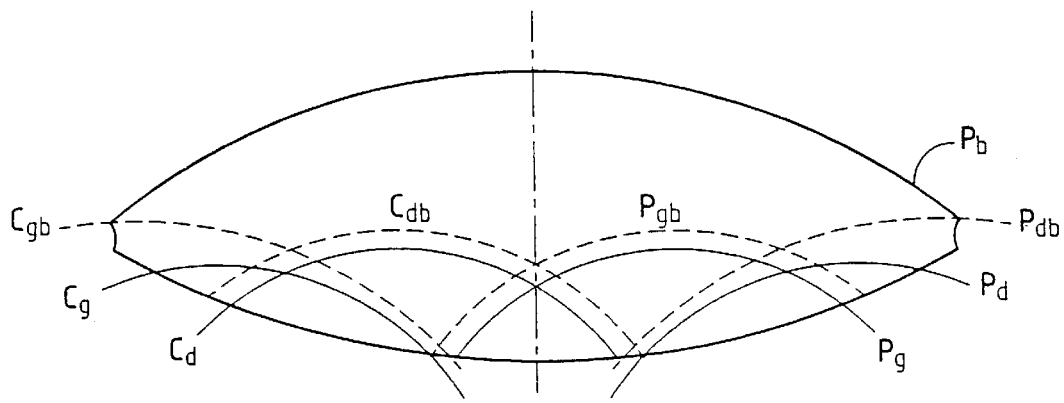
FIG. 10 is a schematic representation, seen from above, of the dashboard and the outer envelopes of the movement of the driver's and the passenger's hands, corresponding to gripping with three fingers, and to gripping by the fingertips.
Figure 11A:
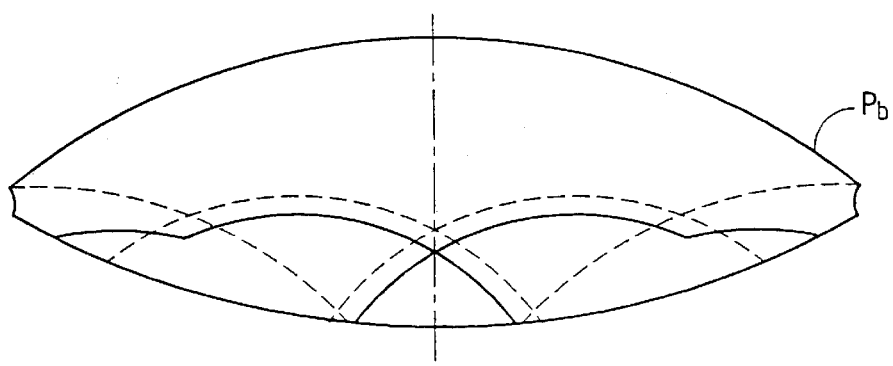
FIGS. 11a to 11g show the zones of the envelope of the dashboard which are accessible and inaccessible to the driver's and the passenger's various hands, corresponding to gripping with three fingers, or to gripping by the fingertips.
Figure 11B:
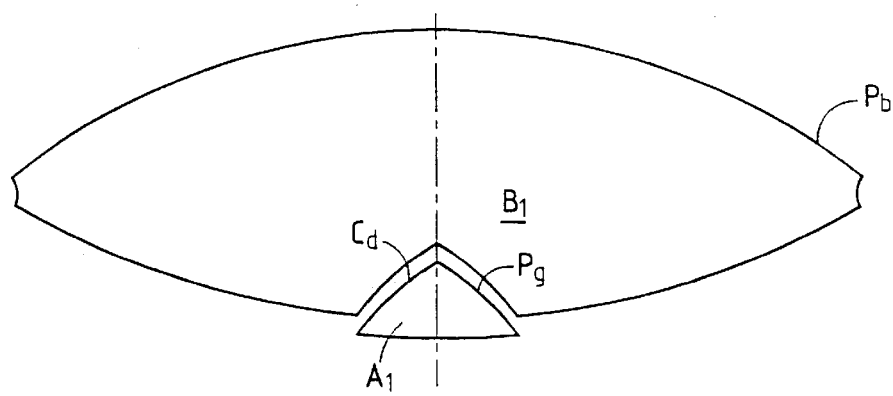
Figure 11C:
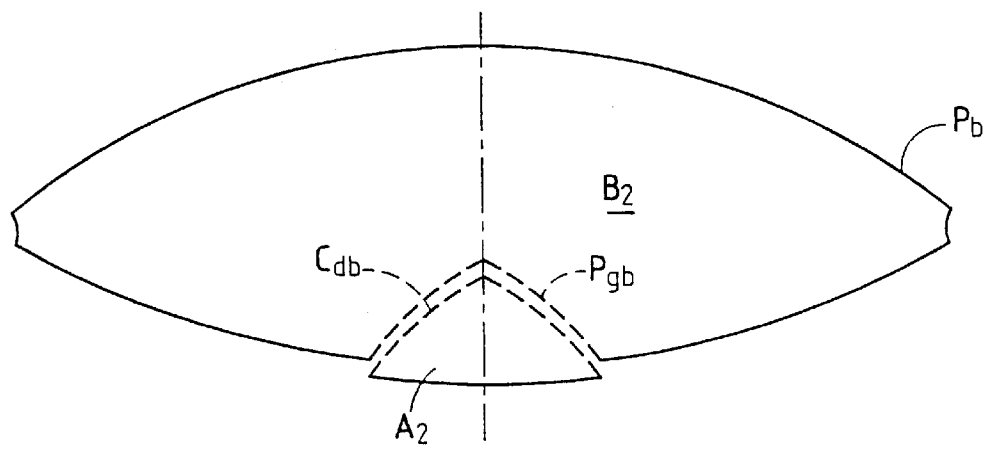
Figure 11D:
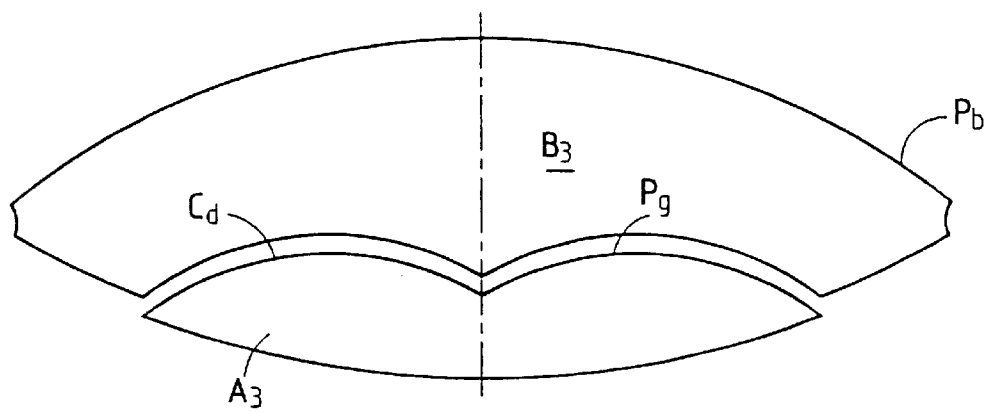
Figure 11E:
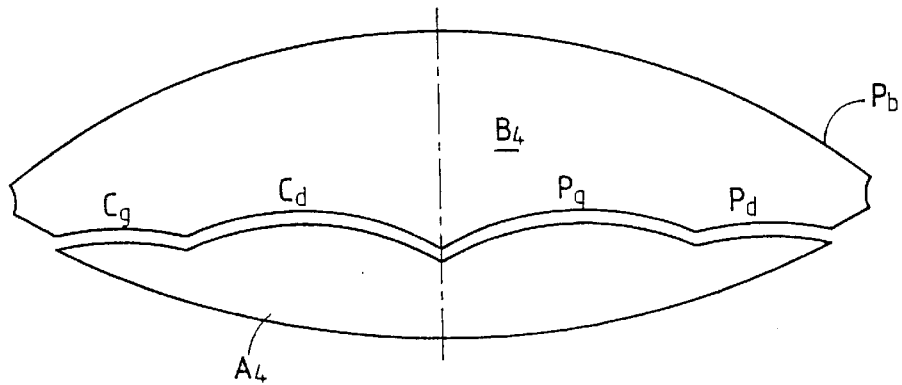
Figure 11F:
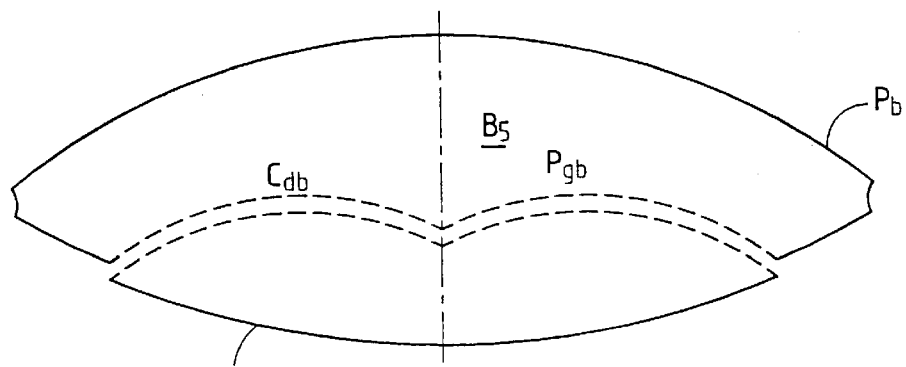
Figure 11G:
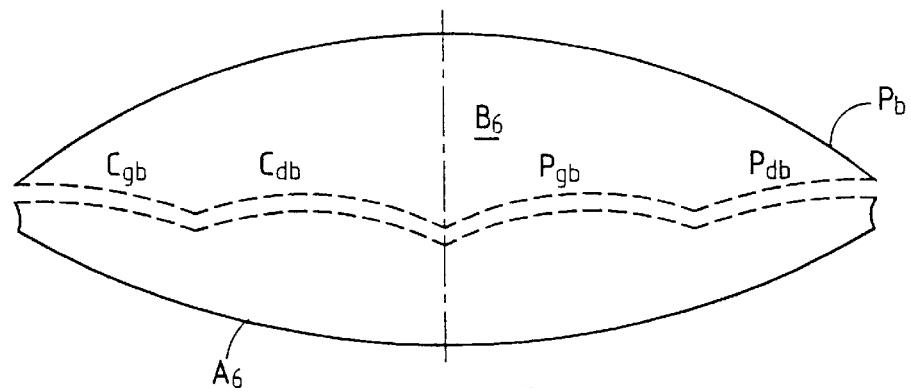

The ducts between the various air outlets of the housing 1 and the various de-icing or aeration vents are arranged in a diffusion unit 60. This diffusion unit, having only thin walls bounding partly the various ducts and connecting walls, is also produced by assembling two pieces, a main piece 61 and a lower cover 62 situated under the main piece 61. When the two pieces 61 and 62 are assembled together, the diffusion unit 60 has an upper part 70, of oblong shape, which extends over the entire width of the passenger compartment H and to the rear of the windscreen 44. As seen in FIGS. 5 and 6, the upper part 70 is situated above the upper face 13 of the housing 1 and below the upper fascia 11 of the dashboard 12. The upper part 70 has a bottom 21, in which is arranged an opening 22 which fits onto the upper face 13 of the housing 1 (Thus, the upper face corner 13a lines up with the bottom corner 21a), a rear wall 23 in which a recess 24 is provided above the console 3, a front wall 32 following the contour of the base of the windscreen 44, and an intermediate partition 71, which passes transversely through the opening 22 and extends transversely over substantially the entire length of the upper part 70 and which divides the interior of the upper part 70 into a front chamber 72, situated close to the windscreen 44, and a rear chamber 73 which is larger than the front chamber 72.

The upper fascia 11 of the dashboard 12 has a hood 40 which covers chambers 72 and 73. Located above the front chamber 72, the hood 40 contains de-icing vents 10. While the section of the hood 40 located above the rear chamber 73 has multiple perforations of which the diffusing surface is at least equal to 1.5 dm², preferably 2.5 dm², or 3 dm², so as to permit gentle diffusion of the central aeration air into the passenger compartment. The multiple perforations are spread over the majority of the hood 40 above the rear chamber 73, and may be partially closed off by deflectors or louvers.

The central aeration where duct, formed by the rear chamber 73 of oblong shape, hence extends laterally over the entire width of the dashboard and opens via a diffusing surface sited on the upper fascia 71 of the dashboard. This arrangement makes it possible to produce gentle aeration spread over the majority of the upper fascia 11, and to free some space above and behind the central console 3. The recess 24 makes it possible to accommodate an additional display above the central console 3.

When the two pieces 61 and 62 are assembled together, the diffusion unit 60 has, below the upper part 70 described above, a lower part 75 in which are arranged the lateral aeration ducts 51a and 51b and the lower aeration ducts, in particular for heating the feet. This lower part 75 is in the form of a widened U, the lower branch of which is situated under the lower duct 8 and includes the feet-heating vents, and the lateral branches of which constitute the lateral aeration ducts 51a and 51b, which are connected to the vertical lateral faces of the housing 1 and open into the front lateral zones of the upper part 70. Connecting and stiffening walls join the various branches of the widened U and the lower part 75 to the upper part 70, so that the diffusion unit 60 constitutes a rigid assembly.

The rear wall 23 of the diffusion unit 20 of the first embodiment, and of the diffusion unit 60 of the second embodiment, are shaped so as to make it possible to fix the meters and various displays.

The arrangement of the diffusion unit 20 or 60 makes it possible to increase the space available above the central console 3, and to produce gentle central aeration above the upper fascia 11 of the dashboard 12.

The walls which bound the air ducts in the diffusion units may have internal ribs, which extend in the direction of the flow of the air and which make it possible to reduce the noise emitted by the aeration and de-icing vents. On their internal faces, these walls may also have a plurality of spikes, which prevent detachment of the boundary layers and reduce the noise emitted.

This arrangement also makes it possible to simplify the assembly of the cockpit 2.

In order to do this, the following steps are carried out
a) a cross-member 80 is placed on a mounting support;
b) the electrical harness is mounted on the cross-member 80 and the diffusion unit 20 or 60;
c) the air conditioning apparatus is mounted on the cross-member, the housing 1 comprising means 81 for attachment to the cross-member 80;
d) the one-piece diffusion unit 20 or 60 is mounted horizontally on the cross-member 80 via the rear of the housing 1, so that the opening 22 of the diffusion unit 20, or of the upper part 70 of the diffusion unit 60, coincides with the upper face 13 of the housing 1, and the inlets of the lateral aeration ducts 51a and 51b of the lower part 75 of the diffusion unit 60 coincide with the vertical lateral faces of the housing 1, it being possible to make a seal between the housing 1 and the diffusion unit by interlock beads or joints;
e) if appropriate, the meters are mounted on the diffusion unit 20 or 60;
f) the dashboard body 82 is mounted on the cross-member 80 and the various equipment items are electrically connected;
g) the lateral aeration diffusers are mounted on the diffusion unit 60 or on the hood 40;
h) the assembly is mounted on the vehicle, and the ends of the cross-member 80 are fixed;
i) the hood 40 is mounted on the diffusion unit 20 or 60.

What we claim is:

1. An installation for heating, ventilating and/or air conditioning the passenger compartment of a vehicle, of the type having air treatment and distribution means accommodated at least partly in a housing provided with air outlets, which are provided in a fascia of a dashboard, via ducts connecting said outlets to vents, said dashboard having an upper fascia and a front fascia, wherein a central aeration vent is located exclusively in the zone of an envelope of the dashboard located outside the intersection of outer envelopes of the movement of the driver's right hand and of the passenger's left hand, corresponding to gripping with three fingers,
wherein the ducts connecting the outlets of the upper face of the housing to the corresponding vents are arranged in a diffusion unit which extends transversely under the upper fascia of the dashboard, said diffusion unit extends transversely over the entire length of the upper fascia of the dashboard and has at least one de-icing duct and at least one central aeration duct in the form of an oblong diffusion chamber, said central aeration duct in communication with said central aeration vent.

2. The installation of claim 1, wherein the central aeration vent is located exclusively in the zone of the envelope of the dashboard located outside the intersection of the outer envelopes of the movement of the driver's right hand and of the passenger's left hand, corresponding to gripping by the fingertips.

3. The installation of claim 1, wherein the central aeration vent is located exclusively in the zone of the envelope of the dashboard located outside the junction of the outer envelopes of the movement of the driver's right hand and of the passenger's left hand, corresponding to gripping with three fingers.

4. The installation of claim 1, wherein the central aeration vent is located exclusively in the zone of the envelope of the dashboard located outside the junction of the outer envelopes of the movement of the driver's right and left hands and of the passenger's right and left hands, corresponding to gripping with three fingers.

5. The installation of claim 1, wherein the central aeration vent is located exclusively in the zone of the envelope of the dashboard located outside the junction of the outer envelopes of the movement of the driver's right hand and of the passenger's left hand, corresponding to gripping by the fingertips.

6. The installation of claim 1, wherein the central aeration vent is located exclusively in the zone of the envelope of the dashboard located outside the junction of the outer envelopes of the movement of the driver's right and left hands and of the passenger's right and left hands, corresponding to gripping by the fingertips.

7. An installation for heating, ventilating and/or air conditioning the passenger compartment of a vehicle, of the type having air treatment and distribution means accommodated at least partly in a housing provided with air outlets, which are provided in a fascia of a dashboard, via ducts connecting said outlets to vents, said dashboard having an upper fascia and a front fascia, wherein a central aeration vent is located exclusively in the zone of an envelope of the dashboard located outside the intersection of outer envelopes of the movement of the driver's right hand and of the passenger's left hand, corresponding to gripping with three fingers, and wherein the central aeration vent is provided in the upper fascia of the dashboard, and has a diffusing surface whose air passage cross-section is at least equal to 1.5 dm$^2$, wherein the ducts connecting the outlets of the upper face of the housing to the corresponding vents are arranged in a diffusion unit which extends transversely under the upper fascia of the dashboard, said diffusion unit extends transversely over the entire length of the upper fascia of the dashboard and has at least one de-icing duct and at least one central aeration duct in the form of an oblong diffusion chamber, said central aeration duct in communication with said central aeration vent.

8. The installation of claim 7, wherein the passage cross-section for the air is in excess of 2.5 dm$^2$.

9. The installation of claim 7, wherein the de-icing air outlet and the central aeration air outlet open into an upper face of the housing, and the ducts connecting the outlets of the upper face of the housing to the corresponding vents are arranged in a diffusion unit which extends transversely under the upper fascia of the dashboard, the said diffusion unit having, in its front central zone, at least one de-icing duct directed at the windscreen, and, to the rear of the de-icing duct, at least one central aeration duct produced in the form of an oblong diffusion chamber which extends transversely under the upper fascia of the dashboard.

10. The installation according to claim 9, wherein the diffusion chamber extends transversely over the entire length of the upper fascia of the dashboard.

11. The installation of claim 9, wherein the upper fascia of the dashboard is produced in the form of a hood covering the diffusion unit.

12. The installation of claim 11, wherein the hood has multiple perforations above the diffusion chamber.

13. The installation of claim 9, wherein the de-icing duct and the diffusion chamber are bounded by thin walls.

14. The installation of claim 13, wherein the diffusion unit is produced by assembling two complementary pieces moulded in thermoplastic material.

15. The installation of claim 9, wherein the housing and the diffusion unit are fixed on a cross-member.

16. The installation of claim 9, wherein the lateral aeration air outlets of the housing also open into the upper face of the said housing, the said outlets being capable of delivering treated air to the lateral aeration vents provided in the fascia of the dashboard, via lateral aeration ducts connecting the said outlets to the said vents, and wherein the said lateral aeration ducts are disposed in the diffusion unit and extend laterally under the diffusion chamber.

17. The installation of claim 16, wherein the air inlet of the lateral aeration ducts is located between the air inlets of the de-icing duct and of the diffusion chamber, and their outlets are provided in the front lateral corners of the upper fascia of the dashboard.

18. The installation of claim 17, wherein the diffusion unit is produced by assembling two complementary pieces moulded in thermoplastic material, one of the pieces being in the form of a trough having an air inlet matched to the shape of the upper face of the housing, the other piece fitting into the said trough and constituting the partitions separating the various ducts.

19. The installation of claim 9, wherein the housing furthermore has lateral outlets for delivering air, on the one hand, to lateral aeration vents provided in a fascia of the dashboard, via lateral aeration ducts connecting the said outlets to the said vents and, on the other hand, to feet aeration vents which open into the lower zone of the passenger compartment, via lower ducts, and in that the said lateral aeration ducts and the said lower ducts are arranged in a lower part of the diffusion unit.

20. The installation of claim 19, wherein the diffusion unit is produced by assembling two complementary pieces moulded in thermoplastic material, namely a main piece having thin walls partly bounding the ducts, and a lower cover which completes the ducts.

* * * * *

UNITED STATES PATENT AND TRADEMARK OFFICE
CERTIFICATE OF CORRECTION

PATENT NO. : 6,508,701 B1
DATED : January 21, 2003
INVENTOR(S) : Foury

It is certified that error appears in the above-identified patent and that said Letters Patent is hereby corrected as shown below:

<u>Title page,</u>
Item [73], should read as follows:

-- [73] Assignee: Valeo Climatisation, La Verriere (FR) --

Signed and Sealed this

Tenth Day of June, 2003

JAMES E. ROGAN
*Director of the United States Patent and Trademark Office*